United States Patent
Green

(10) Patent No.: US 9,776,638 B1
(45) Date of Patent: Oct. 3, 2017

(54) REMOTE INTERROGATION AND OVERRIDE FOR AUTOMATED DRIVING SYSTEM

(71) Applicant: GM Global Technology Operations LLC, Detroit, MI (US)

(72) Inventor: Charles A. Green, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/133,312

(22) Filed: Apr. 20, 2016

(51) Int. Cl.
| | |
|---|---|
| *B60W 30/18* | (2012.01) |
| *H04W 4/00* | (2009.01) |
| *H04L 12/24* | (2006.01) |
| *H04W 4/04* | (2009.01) |
| *G05D 1/00* | (2006.01) |
| *B60W 10/20* | (2006.01) |
| *B60W 10/18* | (2012.01) |
| *B60W 10/04* | (2006.01) |

(52) U.S. Cl.
CPC ............ *B60W 30/18* (2013.01); *B60W 10/04* (2013.01); *B60W 10/18* (2013.01); *B60W 10/20* (2013.01); *G05D 1/0022* (2013.01); *G05D 1/0088* (2013.01); *H04L 41/069* (2013.01); *H04W 4/008* (2013.01); *H04W 4/04* (2013.01); *B60W 2540/04* (2013.01); *B60W 2710/18* (2013.01); *B60W 2710/20* (2013.01); *B60W 2720/10* (2013.01)

(58) Field of Classification Search
CPC ...... B60W 30/18; B60W 10/04; B60W 10/18; B60W 10/20; B60W 2540/04; B60W 2710/18; B60W 2710/20; B60W 2720/10; G05D 1/0022; G05D 1/0088; H04L 41/069; H04W 4/008; H04W 4/04
See application file for complete search history.

(56) References Cited

U.S. PATENT DOCUMENTS

| | | | |
|---|---|---|---|
| 2010/0256852 A1* | 10/2010 | Mudalige | G08G 1/163 701/24 |
| 2017/0090476 A1* | 3/2017 | Letwin | G05D 1/0077 |

\* cited by examiner

*Primary Examiner* — Yuen Wong

(57) ABSTRACT

An autonomous vehicle includes an automated driving system configured to automatically control vehicle steering, acceleration, and braking during a drive cycle without operator intervention. The vehicle additionally includes a wireless communication system configured to communicate with a remote communication device. The vehicle further includes a controller configured to communicate vehicle characteristics data via the wireless communication system. The vehicle characteristics data include a vehicle status identifier indicating automated driving system control of the vehicle. The controller is further configured to, in response to a remote override request from a remote communication device, command the automated driving system to perform a minimal risk condition maneuver to stop the vehicle.

11 Claims, 3 Drawing Sheets

REMOTE INTERROGATION AND OVERRIDE FOR AUTOMATED DRIVING SYSTEM

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

A vehicle according to the present disclosure includes an automated driving system ("ADS") configured to automatically control vehicle steering, acceleration, and braking during a drive cycle without human intervention. The vehicle additionally includes a wireless communication system configured to communicate with a remote communication device. The vehicle further includes a controller configured to communicate vehicle data via the wireless communication system. The vehicle data include a vehicle status identifier indicating the ADS control of the vehicle.

According to various embodiments, the wireless communication system includes a dedicated short range communications system.

According to various embodiments, the controller is configured to communicate the vehicle data in response to a request from a remote communication device.

According to various embodiments, the controller is further configured to, in response to a remote override request from a remote communication device, command the ADS to perform a minimal risk condition maneuver. In such embodiments, the controller may be further configured to verify an authorized status of the remote communication device prior to commanding the ADS to perform the minimal risk condition maneuver.

According to various embodiments, the vehicle data additionally includes a model identifier associated with the ADS.

A system for controlling a vehicle according to the present disclosure includes a remote communication device. The remote communication device is configured to wirelessly communicate with a wireless communication system in an automotive vehicle having an ADS configured to automatically control vehicle steering, acceleration, and braking during a drive cycle without human intervention. The remote communication device is configured to, in response to a user input, communicate a remote override request to the wireless communication system to command the ADS to automatically perform a minimal risk condition maneuver.

According to various embodiments, the system also includes a vehicle having an ADS configured to automatically control vehicle steering, acceleration, and braking during a drive cycle without human intervention, a wireless communication system, and a controller. The controller is configured to, in response to the remote override request, command the ADS to perform a minimal risk condition maneuver to stop the vehicle.

According to various embodiments, the remote communication device is further configured to receive vehicle data from the wireless communication system. The vehicle data include a vehicle status identifier indicating the ADS control of the vehicle. The remote communication device is additionally configured to present an alert in response to the vehicle status identifier indicating ADS control of the vehicle. In such embodiments, the remote communication device may be in communication with a visual display, the alert may include at least one symbol on the display representing a location of the automotive vehicle. In such embodiments, the remote communication device may be further configured to communicate a data request to the wireless communication system, with the vehicle data being received based on the data request. In such embodiments, the vehicle data may additionally include a model identifier associated with the ADS, and the remote communication device may be configured to log a record of the remote override request and the model identifier associated with the ADS. Such variants may also include an additional remote communication device configured to, in response to the record, communicate a remote override request to an additional vehicle having an additional ADS with the model identifier.

According to various embodiments, the remote communication device is configured to wirelessly communicate with the wireless communication system over a dedicated short range communications channel.

According to various embodiments, the remote communication device is further configured to communicate an authorized status to the wireless communication system.

A method of controlling a vehicle according to the present disclosure includes providing a vehicle with an ADS configured to automatically control vehicle steering, acceleration, and braking during a drive cycle without human intervention and a wireless communication system. The method additionally includes controlling the wireless communication system to communicate vehicle data, including a vehicle status identifier indicating the ADS control of the vehicle. The method further includes, in response to receiving a remote override request from a remote communication device, controlling the ADS to perform a minimal risk condition maneuver.

According to various embodiments, the wireless communication system includes a dedicated short range communications system.

According to various embodiments, the control of the wireless communication system to communicate vehicle data is in response to a request from a remote communication device.

According to various embodiments, the method additionally includes verifying an authorized status of the remote communication device prior to commanding the ADS to perform the minimal risk condition maneuver.

According to various embodiments, the vehicle data additionally includes a model identifier associated with the ADS.

Embodiments according to the present disclosure provide a number of advantages. For example, the present disclosure provides a system and method by which a vehicle under the control of an ADS may be pulled over by an external authority entity, such as a manufacturer representative, ambulance, or a police officer. The vehicle may thus be remotely removed from traffic, increase confidence in the ADS on the part of both the external authority entity and any passengers in the vehicle.

The above advantage and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
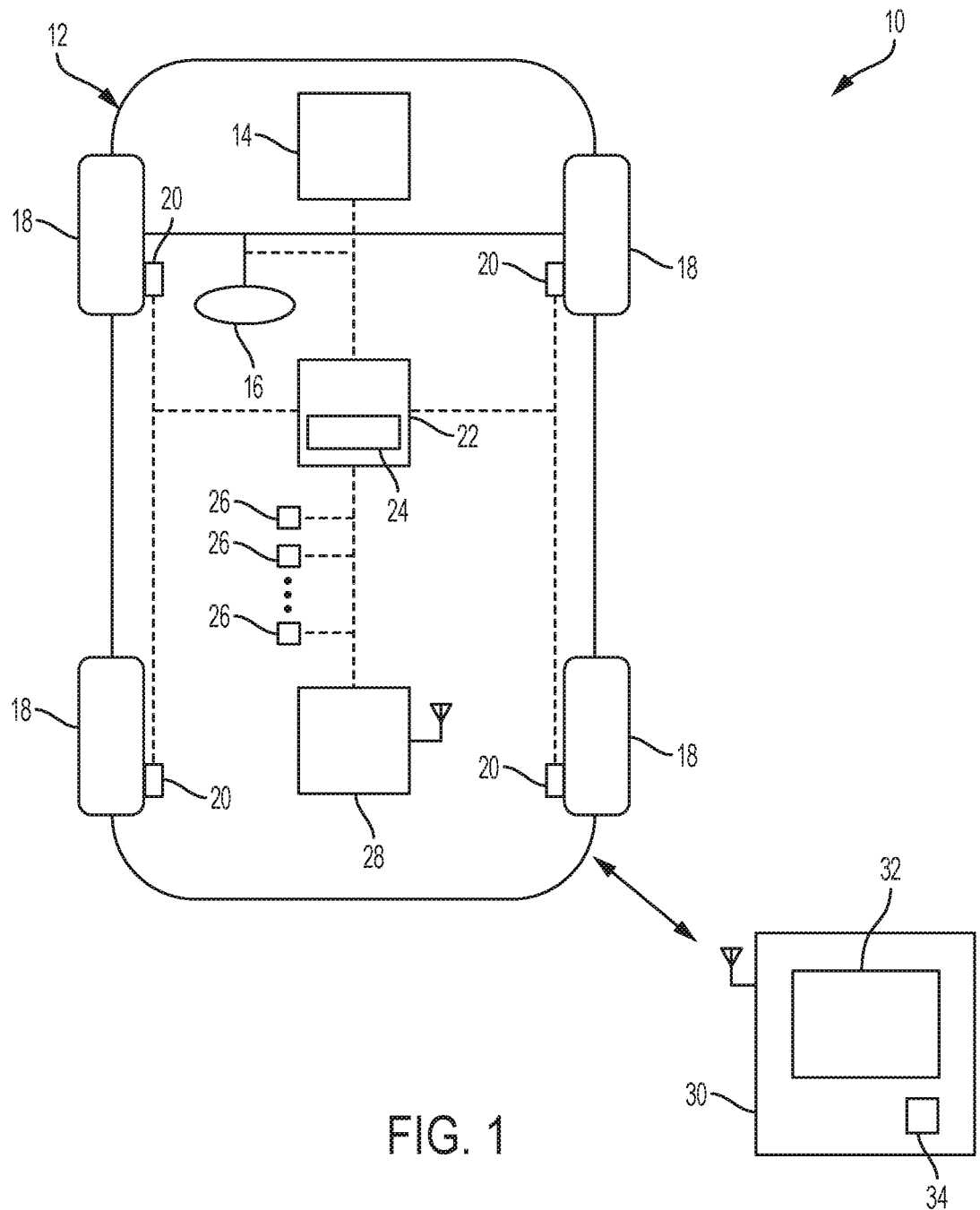
FIG. 1 is a schematic representation of a first embodiment of a system for controlling a vehicle according to the present disclosure.

Referring now to FIG. 1, a system 10 for controlling a vehicle according to the present disclosure is shown in schematic form. The system 10 includes an automotive vehicle 12. The automotive vehicle 12 includes a propulsion system 14, which may in various embodiments include an internal combustion engine, an electric machine such as a traction motor, and/or a fuel cell propulsion system. The automotive vehicle 12 additionally includes a steering system 16. While depicted as including a steering wheel for illustrative purposes, in some embodiments within the scope of the present disclosure, the steering system 16 may not include a steering wheel. The automotive vehicle 12 additionally includes a plurality of vehicle wheels 18 and associated wheel brakes 20 configured to provide braking torque to the vehicle wheels 18. The wheel brakes 20 may, in various embodiments, include friction brakes, a regenerative braking system such as an electric machine, and/or other appropriate braking systems.

The propulsion system 14, steering system 16, and wheel brakes 20 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 is provided with an automated driving system (ADS) 24 for automatically controlling the propulsion system 14, steering system 16, and wheel brakes 20 to control vehicle acceleration, steering, and braking, respectively, without human intervention. The ADS 24 is configured to control the propulsion system 14, steering system 16, and wheel brakes 20 in response to inputs from a plurality of sensors 26, which may include RADAR, LIDAR, optical cameras, thermal cameras, ultrasonic sensors, and/or additional sensors as appropriate.

The ADS 24 is preferably a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. However, embodiments according to the present disclosure may include any ADS capable of automatically performing a minimal risk condition maneuver, as will be discussed in further detail below.

The vehicle 12 additionally includes a wireless communication system 28 in communication with or under the control of the controller 22. The wireless communication system 28 is preferably configured to communicate via a dedicated short-range communications (DSRC) channel. DSRC channels refer to one-way or two-way short-range to medium-range wireless communication channels specifically designed for automotive use and a corresponding set of protocols and standards. However, additional or alternate wireless communications standards, such as IEEE 802.11, are also considered within the scope of the present disclosure.

While the ADS 24 may be designed for robust operation under a variety of operating conditions, in some situations an external authority entity, such as a manufacturer representative, ambulance, or a police officer, may desire that the vehicle 12 be pulled over to the side of the road or otherwise removed from traffic. However, when under the control of the ADS 24, the vehicle 12 may not satisfactorily respond to typical signals indicative of a request to pull over, such as flashing lights or sirens associated with an emergency vehicle.

The system 10 therefore includes a remote communication device 30 to enable an external authority entity to determine whether the vehicle 12 is under the control of the ADS 24 and, if so, to optionally issue a remote override request to the vehicle.

The remote communication device 30 is configured to wirelessly communicate using a compatible communication protocol with that of the wireless communication system 28 of the vehicle 12, e.g. DSRC.

The wireless communication system 28 is configured to communicate information related to the vehicle 12 and the ADS 24 to the remote communication device 30. According to a preferred embodiment, the wireless communication system 28 is configured to communicate the information in response to an identification request from the remote communication device 30. In a further preferred embodiment, the remote communication device 30 is configured to communicate the identification request in conjunction with an authorization code or other authorized status signifier. In an alternate embodiment, the wireless communication system is configured to continuously communicate the information. In addition, communication between the remote communication device 30 and the wireless communication system 28 may be encrypted. Additional security features known to those skilled in the art may also be used. The risk of unintentional or unauthorized communication of information may thus be reduced.

In one embodiment, the remote communication device 30 is a dedicated unit. In another embodiment, the remote communication device is integrated into a larger vehicle-to-vehicle or vehicle-to-infrastructure communication system.

The remote communication device 30 includes a display 32, and is configured to display information received from the wireless communication system 28 on the display 32. The information may include, but is not limited to, the location of the vehicle 12, a model number associated with the ADS 24, health information associated with the sensors 26 and/or other vehicle components, and other pertinent information.

The remote communication device 30 additionally includes at least one input interface 34. In various embodiments, the input interface 34 includes a physical button, a touch-sensitive portion of the display 32, or other appropriate input mechanisms.

The remote communication device 30 is configured to, in response to a user input to the input interface 34, communicate a remote override request to the wireless communication system 28.

The controller 22 is configured to, in response to receiving the remote override request via the wireless communication system 28, command the ADS 24 to perform an automated maneuver to achieve a minimal risk condition. The minimal risk condition refers to a condition in which a human user or ADS may bring a vehicle in order to reduce a risk of collision when a given trip cannot or should not be completed. This maneuver, which may be referred to as a minimal risk condition maneuver, may vary depending on current vehicle location and traffic conditions. The minimal risk condition maneuver may include decelerating the vehicle 12 and/or bringing the vehicle 12 to a full stop. The minimal risk condition maneuver may entail automatically bringing the vehicle 12 to a slow or stop within a current travel path, or it may entail a more extensive maneuver designed to remove the vehicle 12 from an active lane of traffic, e.g. by pulling the vehicle 12 over to a shoulder. Various other maneuvers may be performed as part of a minimal risk condition maneuver.

The remote communication device 30 is preferably configured to communicate the remote override request in conjunction with an authorization code or other authorized status signifier. Additional security features known to those skilled in the art may also be used. The risk of unintentional or unauthorized transmission of a remote override request may thus be reduced.

The remote communication device 30 is also configured to, in response to a second user input to the input interface 34, discontinue the remote override request. This may include communicating an override released signal to the wireless communication system 28. In response to the discontinuation of the remote override request, the ADS 24 may control the vehicle to resume driving operation. Thus, if the external authority entity determines that the remote override request is no longer necessary, the ADS may control the vehicle to continue a previous trip.

Figure 2:
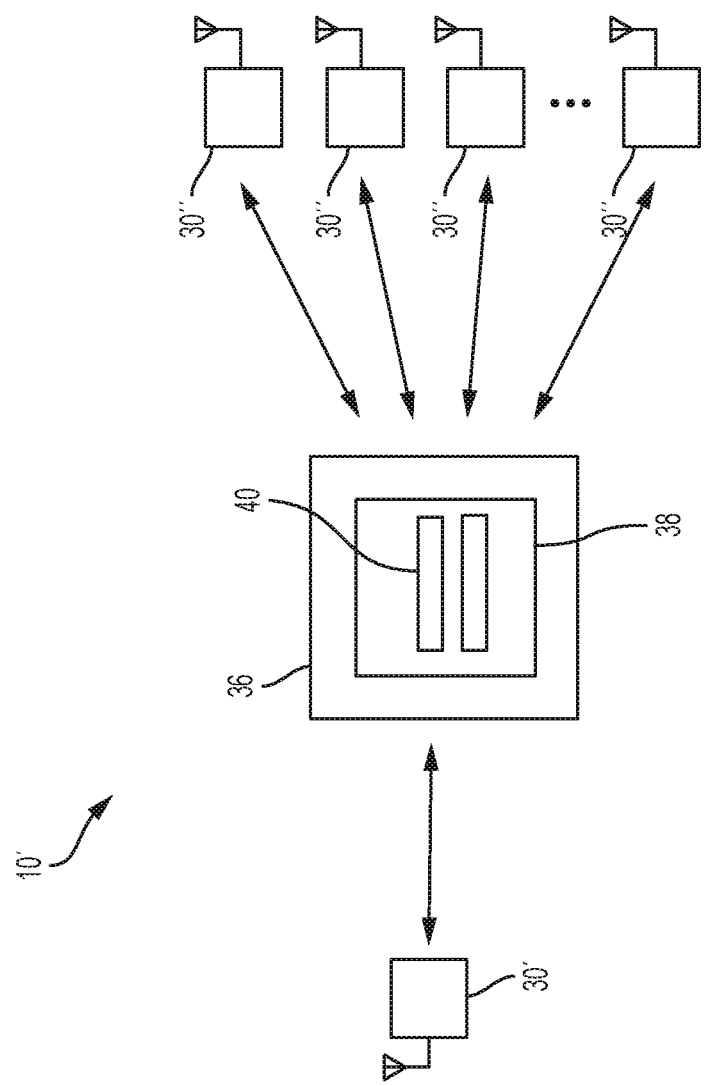
FIG. 2 is a schematic representation of a second embodiment of a system for controlling a vehicle according to the present disclosure.

Referring now to FIG. 2, a second embodiment of a system 10' for controlling a vehicle is shown. The system 10' includes a remote communication device 30'. The remote communication device 30' is preferably configured generally similar to the remote communication device 30 as shown in FIG. 1 and discussed above.

The remote communication device 30' is in communication with at least one remote server 36. In a preferred embodiment, the remote communication device 30' is configured to wirelessly communicate with the server 36, e.g. via cellular data communication or other appropriate wireless communication protocols.

The remote communication device 30' is configured to communicate at least a portion of data received from a vehicle wireless communication device to the server 36. The server 36 includes at least one computer readable storage device 38. The server 36 may include a microprocessor or central processing unit (CPU) in communication with the computer readable storage device. The computer readable storage device 38 is provided with data 40, e.g. in the form of one or more databases, including information about a plurality of vehicles, operators, and/or ADS models. The data 40 preferably includes a cumulative number of remote override events associated with various ADS models. The data 40 may also include other information such as an insurance database and/or an operator's license database. In a preferred embodiment, the remote communication device 30' may both read and write to the data 40, e.g. to log a remote override event and an associated ADS model identifier. The ADS model identifier may include various characteristics related to and/or usable to identify a particular ADS, such as software version numbers associated with at least one ADS module, a listing of components cooperating with the ADS, and/or a model of the vehicle under ADS control.

A plurality of additional remote communication devices 30" are also in communication with the server 36. The additional remote communication devices 30" are configured to receive information from the server 36, e.g. by accessing the databases 38 or by having information "pushed" from the server 36 to the additional remote communication devices 30".

In a preferred embodiment, in response to the server 36 logging a number of incidents associated with an ADS model number exceeding a calibrated incident threshold, the server 36 communicates a model-wide remote override request to the remote communication device 30' and the additional remote communication devices 30". In response to the model-wide remote override request, the remote communication device 30' and the additional remote communication devices 30" will communicate a remote override request to any detected vehicle having an ADS having the model identifier associated with the model-wide remote override request. In response to a model-wide remote override request, vehicles having an ADS having the relevant model identifier may be disabled until a repair condition is satisfied, e.g. manufacturer refurbishment of the vehicle, software update of the ADS, or other appropriate diagnostic service.

Figure 3:
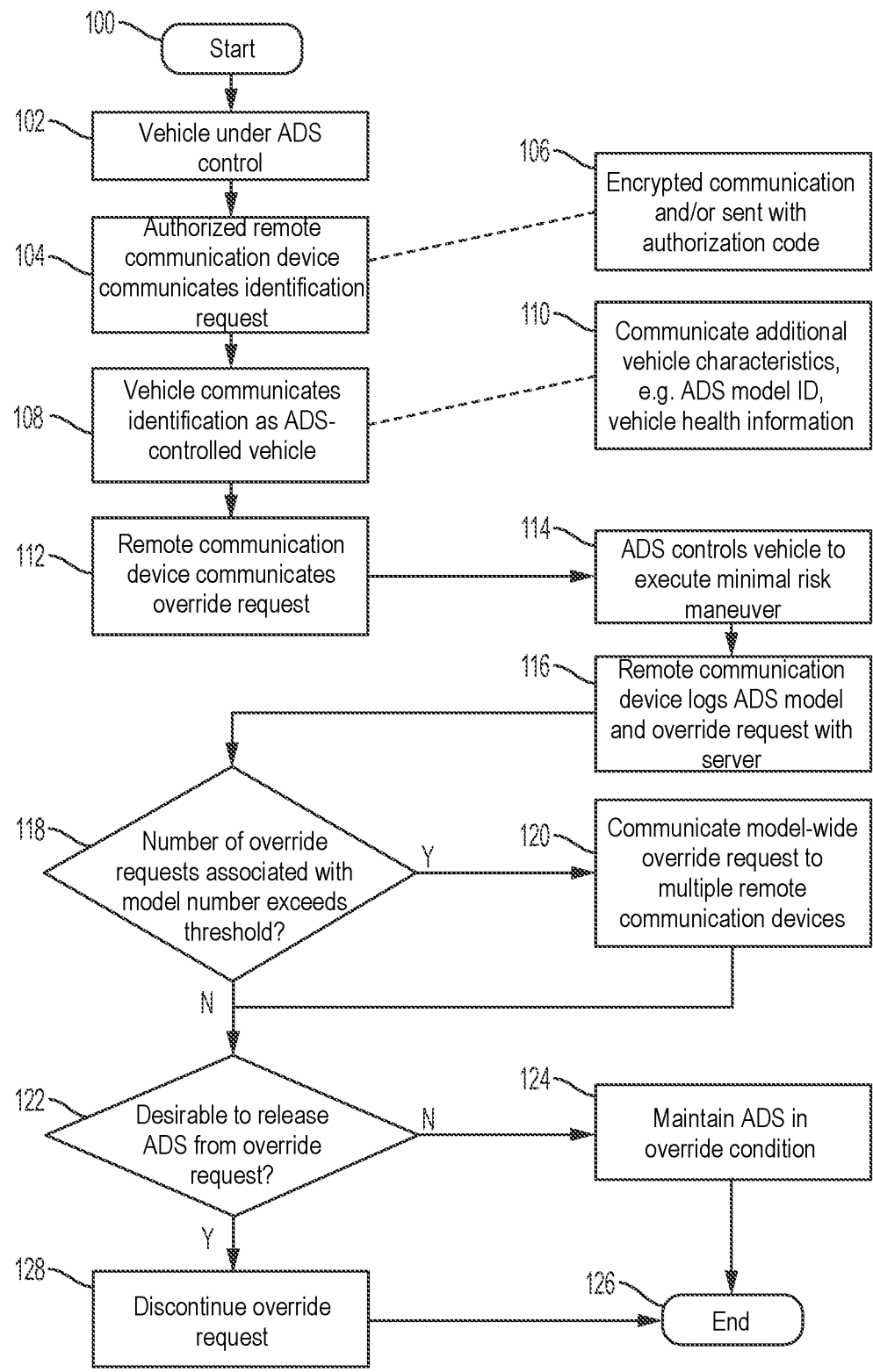
FIG. 3 is a flowchart illustrating an embodiment of a method for controlling a vehicle according to the present disclosure.

Referring now to FIG. 3, a method of controlling a vehicle according to the present disclosure is illustrated in flowchart form. The method begins at block 100.

A vehicle having an ADS is being operated under ADS control, as illustrated at block 102. An authorized device external to the vehicle communicates an identification request to the vehicle, as illustrated at block 104. The authorized device may be, for example, a remote communication device similar to that shown in FIG. 1 and discussed above. The identification request may be transmitted in an encrypted communication and/or communicated in conjunction with an authorization code indicating authorized user status, as illustrated at block 106.

In response to the identification request, the vehicle communicates a status identifier indicating that the vehicle is under ADS control, as illustrated at block 108. The vehicle may also communicate additional vehicle characteristics such as an ADS model identifier and/or vehicle health information, as illustrated at block 110.

If desired, the authorized device may communicate a remote override request to the vehicle, as illustrated at block 112. In response to the remote override request, the ADS controls the vehicle to automatically execute a minimal risk condition maneuver, as illustrated at block 114. As discussed above, the minimal risk condition maneuver refers to a maneuver by which the ADS brings to a condition in order to reduce a risk of collision when a given trip cannot or should not be completed.

The remote communication device may then log the remote override request with the server, along with the ADS model identifier associated with the remote override request, as illustrated at block 116. A determination is then made, e.g. on the server, of whether a cumulative number of remote override requests associated with the ADS model identifier exceeds a predefined threshold, as illustrated at operation 118.

If the determination of operation 118 is positive, i.e. the cumulative number of remote override requests does exceed the threshold, then a model-wide remote override request is communicated to multiple remote communication devices, as illustrated at block 120. In response to the model-wide remote override request, the multiple remote communication devices may issue remote override requests to any identified vehicles having an ADS with the associated model identifier. Thus, operation of vehicles having an ADS with the associated model identifier may be overridden until appropriate diagnostic action has been performed. Control then proceeds to operation 122.

If the determination of operation 118 is negative, i.e. the cumulative number of remote override requests does not exceed the threshold, then control proceeds directly to operation 122.

As illustrated at operation 122, a determination is made of whether it is desirable to release the ADS from the remote override request. This may include a determination of whether diagnostic action of the vehicle or of the ADS is required.

If the determination of operation 122 is negative, i.e. it is not desirable to release the ADS from the remote override request, then the ADS is maintained in the remote override condition, as illustrated at block 124. The method ends at block 126.

If the determination of operation 122 is positive, i.e. it is desirable to release the ADS from the remote override request, then the remote override request is discontinued, as illustrated at block 128. This may be performed, for example, via a second user input to the remote communication device as discussed above. The method ends at block 126.

Variations of the above are, of course, possible. As an example, an emergency vehicle such as a police vehicle, ambulance, or fire truck may be configured to transmit a remote override request to all ADS-controlled vehicles when responding to emergencies, e.g. when a siren is active. Thus, any vehicles under the control of an ADS system may automatically execute a minimal risk condition maneuver to make way for the emergency vehicle. Notably, these emergency overrides would not be logged with the server.

As may be seen, systems and methods according to the present disclosure enable an external authority entity to identify a vehicle under the control of an ADS and, if desired, cause the ADS to automatically execute a minimal risk condition maneuver. Thus, the external authority entity may remove a vehicle from traffic when appropriate. Moreover, if appropriate, all vehicles including the particular model of ADS may be overridden until diagnostic action has been performed.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a propulsion system;
   a steering system;
   at least one wheel brake;
   a wireless communication system configured to communicate with a remote communication device; and
   at least one controller configured to control the propulsion system, steering system, and the at least one wheel brake according to an automated driving system during a drive cycle, configured to communicate vehicle data via the wireless communication system, the vehicle data including a vehicle status identifier indicating the automated driving system's control of the vehicle and a model identifier associated with the automated driving system, and configured to, in response to a remote override request from the remote communication device, automatically perform a minimal risk condition maneuver via the automated driving system,
   wherein the remote communication device is configured to log a record of the remote override request and the model identifier associated with the automated driving system, and
   wherein an additional remote communication device is configured to, in response to the record, communicate an additional remote override request to an additional vehicle having an additional automated driving system with the model identifier.

2. The vehicle of claim 1, wherein the wireless communication system includes a dedicated short range communications system.

3. The vehicle of claim 1, wherein the at least one controller is configured to automatically perform the minimal risk condition maneuver in further response to receiving an authorized status of the remote communication device.

4. A system for controlling a vehicle, comprising:
   an automotive vehicle with a propulsion system, a steering system, a wheel brake, a wireless communication system, and at least one controller configured to control the propulsion system, steering system, and the wheel brake according to an automated driving system during a drive cycle; and
   a remote communication device configured to wirelessly communicate with the wireless communication system, the remote communication device being configured to, in response to a user input, communicate a remote override request to the wireless communication system;
   wherein the at least one controller is further configured to, in response to the remote override request, automatically control the propulsion system, steering system, and the wheel brake, via the automated driving system, to perform a minimal risk condition maneuver;
   wherein the remote communication device is further configured to receive vehicle data from the wireless communication system, the vehicle data including a vehicle status identifier indicating the automated driving system's control of the vehicle, and to present an alert in response to the vehicle status identifier indicating the automated driving system's control of the vehicle;
   wherein the vehicle data additionally include a model identifier associated with the automated driving system, and wherein the remote communication device is configured to log a record of the remote override request and the model identifier associated with the automated driving system; and
   wherein an additional remote communication device is configured to, in response to the record, communicate an additional remote override request to an additional vehicle having an additional automated driving system with the model identifier.

5. The system of claim 4, wherein the remote communication device is in communication with a visual display, and wherein the alert comprises at least one symbol on the display representing a location of the automotive vehicle.

6. The system of claim 4, wherein the remote communication device is further configured to communicate a data request to the wireless communication system, the vehicle data being received based on the data request.

7. The system of claim 4, wherein the remote communication device is configured to wirelessly communicate with the wireless communication system over a dedicated short range communications channel.

8. The system of claim 4, wherein the remote communication device is further configured to communicate an authorized status indicator to the wireless communication system.

9. A method of controlling a vehicle, comprising:
   providing a vehicle with a propulsion system, a steering system, at least one brake, a controller configured to control the propulsion system, steering system, and the at least one brake according to an automated driving system a drive cycle without operator intervention, and a wireless communication system;
   controlling, by at least one controller, the wireless communication system to communicate vehicle data including a vehicle status identifier indicating the automated driving system's control of the vehicle, the vehicle data additionally including a model identifier associated with the automated driving system;
   in response to receiving a remote override request from a remote communication device, controlling, by the at least one controller, the automated driving system to automatically perform a minimal risk condition maneuver;
   logging a record, via the remote communication device, of the remote override request and the model identifier associated with the automated riving system; and in response to the record, communicating, via an additional remote communication device, and additional remote override request to an additional vehicle having an additional automated driving system with the model identifier.

10. The method of claim 9, wherein the wireless communication system includes a dedicated short range communications system.

11. The method of claim 9, further comprising verifying an authorized status of the remote communication device prior to commanding the automated driving system to automatically perform the minimal risk condition maneuver.

* * * * *